Sept. 8, 1959

L. F. PEROTTE 2,903,631

SELENIUM CELLS

Filed June 17, 1958

INVENTOR.
Laurence F. Perotte

BY William D. Roberson

His Attorney

United States Patent Office 2,903,631
Patented Sept. 8, 1959

2,903,631

SELENIUM CELLS

Laurence F. Perotte, Arlington, Mass., assignor to General Electric Company, a corporation of New York Application June 17, 1958, Serial No. 742,556

9 Claims. (Cl. 317—241)

The present invention relates to unilaterally conducting electric circuit elements and, more particularly, to selenium photovoltaic and rectifier cells having improved electrical characteristics.

Alternating current rectifiers which utilize the unidirectional conducting characteristics of selenium are commonly produced by applying at least one thin layer of selenium to a carrier plate which also serves as an electrode, by forming a barrier layer atop the selenium, and by affixing a counter-electrode to the assembly. Photovoltaic cells may be manufactured in a like manner with the counterelectrode element being of a light-transmitting character. In both the rectifier and photovoltaic units, certain electrical characteristics are found to be variable with time, temperatures, and electrical circuit conditions, and a relatively lengthy forming or aging process is generally employed to aid in establishing initially high blocking resistances and stability of characteristics. The forming process consumes valuable production time and involves added handling and control operations which are costly. Even then it is found that, with time, cells may tend to exhibit greatly altered electrical characteristics, causing appreciable errors to occur in the electrical circuits in which the cells are employed.

Accordingly, it is an object of the present invention to provide a novel selenium cell assembly and method of manufacture to improve the electrical characteristics of selenium cells and to reduce the length of the formation process needed to produce useful output characteristics.

A further object of the invention is to provide improved selenium cells wherein such characteristics as blocking resistance, open-circuit voltage, and photo currents are favorably affected by the formation of improved P–N junctions.

This invention is directed principally to the formation in selenium cells between the selenium and the counter-electrode of an improved n-type layer by a novel process which includes, previous to the application of the counterelectrode, the step of sputtering cadmium onto the sell in an atmosphere preferably of nitrogen and argon, but essentially including nitrogen. Although the chemical nature of the resulting barrier layer is not known with certainty, the evidence suggests strongly that a very thin deposit of cadmium nitride is formed which very greatly improves the n-type characteristics of the cell, resulting in higher blocking resistances and, in photovoltaic cells, greater open-circuit voltages. Furthermore, the cells, which may be in operative condition even without the usual aging operation, require very little additional aging to optimize their characteristics.

Although these teachings are directed toward the formation of a particular new barrier layer by a novel process, it should not be felt that the practice of this invention necessarily excludes the formation of other barrier layers as well. Indeed, I have found that the best embodiment of this invention presently known makes use of an additional barrier layer of differences composition. The provision of the novel barrier layer which is the subject of this invention in and of itself works a great improvement in the characteristics of the selenium cell, but the combination of this barrier layer with others may result in even greater improvement.

As an aid in the understanding of this invention, reference may be had to the accompanying drawings, wherein.

Figure 1:
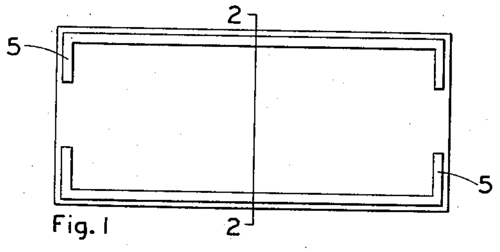
Figure 1 is a plan view of a selenium photovoltaic cell formed according to these teachings.
Figure 2:
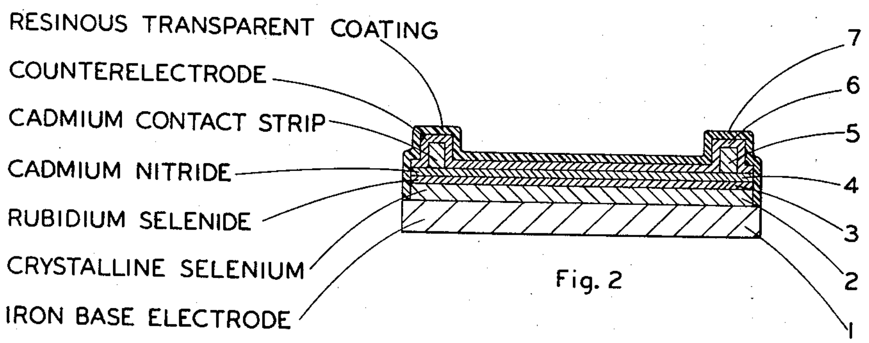
Figure 2 is a cross sectional view taken on line A—A of Figure 1.
Figure 3:
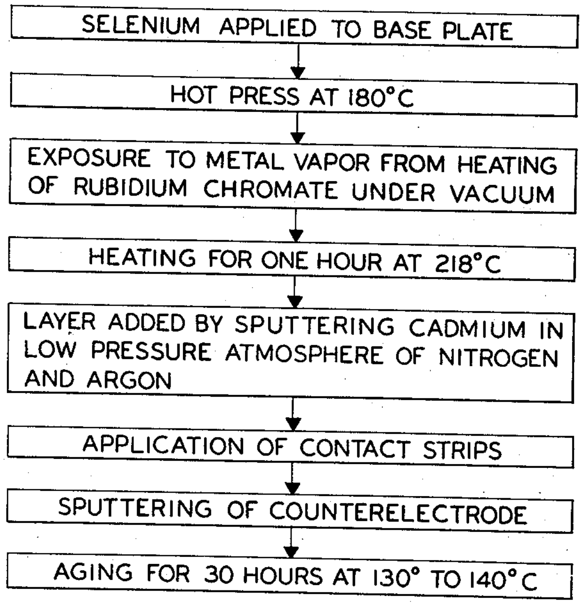
Figure 3 is a flow chart illustrating the more salient aspects of the improved method by which the cell of Figures 1 and 2 is produced.

As a first step, a base plate 1 of iron or other suitable material is coated with a uniform layer 2 of selenium. I prefer to apply the selenium by evaporating a few mils of selenium onto the base plate in a vacuum chamber, although there are many other familiar ways to accomplish this result. Subsequently, the incomplete cells are removed from the vacuum chamber and hot pressed to ensure a uniformity of thickness of the selenium. The last-mentioned step, which is well known in this art, may also be carried out, if desired, after a barrier layer is produced on the cell, though I prefer to perform it previous to the formation of any barrier layers because of the possibility of damage to these layers.

Before the conversion of the selenium layer 2 into a crystalline state, I have found it desirable, although not absolutely necessary, to produce an initial blocking layer 3 rubidium selenide or optionally, of cesium selenide on the surface of the selenium layer. The production of the rubidium selenide or cesium selenide blocking layer is not the subject of this application but is described in my copending application entitled Selenium Cells, Serial No. 742,557, filed of even date herewith and assigned to the same assignee as that of the present application. As is more fully set forth in the aforesaid application, the rubidium selenide layer is formed in a vacuum by evaporating onto the exposed selenium surface a thin layer of rubidium converted into the vapor state by heating rubidium chromate until it decomposes. Because of the electro-positive nature of rubidium, a reaction takes place on contact with the selenium to form rubidium selenide. Thereafter, the previously amorphous selenium layer is converted to a crystalline state in a manner known in the art by heating the incomplete cell at a temperature of approximately 218° C. for about an hour.

According to the present disclosure, an additional layer 4, which I believe to be cadmium nitride, is then added to the selenium cell. In the production of layer 4 the selenium cell is placed in a vacuum chamber which is evacuated and onto which a mixture of gases including nitrogen, essentially, and argon, preferably in a ratio of about one to one at low pressures. The preferred pressures are about 115 microns for each gas. In this atmosphere a few brief electrical discharges are made between a cadmium cathode and the selenium cell as an anode, as a result of which a very thin layer 4 is sputtered onto the cell. Empirical evidence suggests that this layer is cadmium nitride, and for this reason as well as for convenience, I prefer to designate cells treated in this way as nitrided cells or as having nitrided junctions. It is essential that no oxygen or water vapor be present in the sputtering atmosphere, since the presence of either inhibits the formation of the nitride.

It is found that during the process not only is the cadmium electrode eroded, but nitrogen is also consumed, as evidenced by the fact that the nitrogen pressure decreases and the argon pressure remains the same. In control experiments performed using platinum instead of cadmium electrodes, only platinum was deposited on the selenium cell, and the nitrogen pressure remained substantially constant. This strongly suggests that during the sputtering process the nitrogen removed from the mixture of gases reacts only with the cadmium and not with the selenium.

Further evidence for the formation of a nitride of cadmium was obtained on decomposing a cadmium layer sputtered onto glass slides in a nitrogen-argon mixture by heating the slides in a high vacuum. The pressure rise was greater for those with nitrided layers than for glass blanks or for those with cadmium layers obtained by sputtering cadmium in an atmosphere of pure argon. This greater pressure rise can only be due to the nitrogen.

Although layer 4 may be deposited in an atmosphere of pure nitrogen, I have found that the process then takes considerably longer. The process of sputtering is essentially a momentum exchange phenomenon, the ions of the gas in which the discharge takes place acting on the cathode to knock loose metallic ions which travel to the anode. The addition to the nitrogen atmosphere of an inert gas, especially one of a reasonably high atomic weight, appears to result in the formation of a cadmium-rich ionic layer about the cathode which reacts readily with the nitrogen present. The nitrogen ions, being of a lower atomic weight, would not be able to knock loose cadmium ions as readily as would the heavier argon ions, hence the reason that the use of a pure nitrogen atmosphere requires longer periods of sputtering to produce an equivalent blocking layer. As a constituent of the nitrogen atmosphere, argon is selected because of the fact that, among the heavier inert gases, it is relatively inexpensive.

Cadmium contact strips 5 are then placed on the cell. To the cadmium nitride layer 4 and contact strips 5, a counterelectrode is then applied, and this may take the form of sputtered alternate layers of cadmium and platinum. In the case of a photovoltaic cell the counterelectrode should be sufficiently transparent to admit light to the P–N junction, and it is, therefore, made quite thin. In a photovoltaic cell I prefer to employ a known type of counterelectrode incorporating cadmium oxide as a major constituent because it is both transparent and relatively conductive. In either event, good electrical contact should be made between the contact strips and the counterelectrode, and between the counterelectrode and the underlying surface of the cell. The oxide may be formed by sputtering the cadmium in an atmosphere containing sufficient oxygen to oxidize most, but not all, of the cadmium, since an excess of cadmium improves the conductivity of the oxide layer. Argon may also be present in the oxygen atmosphere to improve the momentum exchange as referred to above in connection with the description of the nitrogen atmosphere sputtering. Some metallic cadmium is generally intended to be deposited because of the additional reason that, even with the interposition of a blocking layer, subsequent aging or forming of the cell causes a migration of some atomic cadmium to the selenium layer where it reacts to form cadmium selenide which enhances the characteristics of the P–N junction.

The last layer applied is a layer 7 of a clear resin which serves along with the counterelectrode to protect the cell against the absorption of gases or other substances which might adversely affect the cell's electrical characteristics.

Most selenium photovoltaic cells, especially those having metallic cadmium in the counterelectrode, require a final aging operation at elevated temperatures. This aging operation has two effects, one of which is to thin the counterelectrode so as to permit it to admit more light and consequently increase the current output of the cells. Simultaneously, the aging operation permits a reaction product to form between the cadmium containing counterelectrode and the selenium of the cell to produce a natural blocking layer. This aging operation generally consumes a great amount of time and it is manifestly desirable to reduce the time required to complete the development of the cell characteristics. Within limits, increasing the temperature at which the aging is carried out reduces the amount of time required, but when the temperature exceeds 100° C. by very much, the cell can easily be ruined by the diffusion of the different materials into each other resulting in the destruction of the blocking layer and, hence, deterioration of the P–N junction.

Once the counterelectrode has been applied to a cell formed as described herein, however, the cell is found to be in operative condition even without the customary aging operation and its characteristics are equal to or better than otherwise equivalent aged cells not having the blocking layer of cadmium nitride. This fact of itself establishes that a good P–N junction has already been formed. Nevertheless, subsequent aging of the cell does result in optimizing its characteristics, suggesting that some cadmium has migrated through the previously formed blocking layer to form a small amount of cadmium selenide which further improves the nature of the P–N junction. The nitrided junction, however, appears to prevent the deterioration of the P–N junction by the migration of too much cadmium into the selenium layer. I have found that nitride cells of the nature described above, either with or without the addition of a rubidium selenide or cesium selenide layer, when aged at 130° to 140° C. for as little as 30 hours, exhibit optimum characteristics much better than those of otherwise equivalent cells which are not nitrided. Whereas at these high aging temperatures, most other cells would be destroyed, I have also found that the usual aging temperatures of 75° to 100° C. effect only a slight improvement in the characteristics of nitride cells.

The following table comparing the characteristics of cells described herein with those of otherwise equivalent standard cells employing as a blocking layer only the P–N junction which results from the contact between the selenium layer and a cadmium-containing counterelectrode should serve to emphasize the improvements afforded by a practice of these teachings. The values given are averages of a representative number of cells and the potential and current measurements were made at 60 footcandles of illumination.

| Blocking layer | Open circuit potential (millivolts) | Current with 300 ohm load (microamperes) | Blocking resistance at 5 volts (ohms) | Forward resistance (ohms) |
|---|---|---|---|---|
| Standard | 290 | 240 | 80,000 | 550 |
| Rubidium selenide | 390 | 210 | 530,000 | 650 |
| Cadmium nitride | 420 | 225 | 600,000 | 900 |
| Rubidium selenide plus cadmium nitride | 460 | 230 | 1 meg. | 850 |

A typical selenium rectifier cell not manufactured according to these teachings requires, as a final step in its manufacture, instead of an aging operation, an electrical-forming treatment. This treatment consists of subjecting the cell to an alternating or direct current until a high resistance is developed in the reverse direction. The forming treatment has an object similar to that of the aging treatment in that it results in gradually building up a blocking layer. The forming treatment has generally required several hours for its completion. By a practice of this invention, the basic P–N junction is already available and such forming as may be required to develop optimum cell characteristics may be completed in a matter of minutes instead of hours. The forming process does, however, result in a slight increase in the potential which the nitrided rectifier cell is capable of withstanding.

From what has been set forth above, it will be apparent that the establishment according to these teachings of a nitride n-type blocking layer may be independent of the formation of other layers either between it and the selenium or between it and the counterelectrode. This invention may be practiced by forming the cadmium nitride either alone with no other n-type layers or in combination with others. In combination with other layers, however, there will probably be a particular order in which the layers should be formed to obtain an optimum P–N junction. Thus, I have found that better results are obtained by placing the cadmium nitride layer upon the rubidium selenide layer as indicated by the results summarized in the table instead of vice versa. This suggests that, even as thin as these layers may be, separate startiform layers are formed instead of a single layer of intermixed constituents.

It should thus be apparent that the examples given are illustrative in nature and not necessarily limiting of the scope of the invention in its broader aspects as determined by a fair interpretation of the appended claims.

What I claim as new and desire to secure by Letters Patent of the United States is:

1. A unilaterally conducting circuit element comprising a conducting electrode having a layer of crystalline selenium thereon, a counterelectric for making electrical contact with said selenium layer, and a blocking layer comprising cadmium nitride interposed between said counterelectrode and said selenium layer.

2. A unilaterally conducting circuit element comprising a conducting electrode having a layer of crystalline selenium thereon, a counterelectrode for making electrical contact with said selenium layer, and a blocking layer interposed between said selenium layer and said counterelectrode comprising a material formed by exposing said circuit element to cadmium sputtering in an atmosphere consisting essentially of nitrogen.

3. A unilaterally conducting circuit element comprising a conducting electrode having a layer of crystalline selenium thereon, a counterelectrode for making electrical contact with said selenium layer, and a blocking layer interposed between said selenium layer and said counterelectrode comprising a material formed by exposing said circuit element to cadmium sputtering in an atmosphere consisting essentially of a mixture of nitrogen and an inert gas having a higher atomic weight than that of nitrogen.

4. A unilaterally conducting circuit element comprising a conducting electrode having a layer of crystalline selenium thereon, a counterelectrode for making electrical contact with said selenium layer, and a blocking layer interposed between said selenium layer and said counterelectrode comprising a material formed by exposing said circuit element to cadmium sputtering in a dry oxygen-free atmosphere consisting essentially of a mixture of nitrogen and argon.

5. The process of manufacturing a unilaterally conducting circuit element having a conducting electrode, a selenium layer thereon, and a counterelectrode which includes the step carried out prior to the application of said counterelectrode of producing an n-type layer on said circuit element by sputtering it with cadmium in a low pressure atmosphere consisting essentially of nitrogen.

6. The process of manufacturing a unilaterally conducting circuit element having a conducting electrode, a selenium layer thereon and a counterelectrode which includes after the formation of said selenium layer but before the formation of said counterelectrode the steps of placing said circuit element in an evacuated chamber containing a gas consisting essentially of nitrogen under low pressure, initiating an electrical discharge while in said gas between a cadmium cathode and said circuit element as an anode, whereby an n-type blocking layer is formed on said circuit element.

7. The process of manufacturing a unilaterally conducting circuit element having a conducting electrode, a crystalline selenium layer thereon and a counterelectrode which includes after the formation of said selenium layer but before the formation of said counterelectrode the steps of placing said circuit element in an evacuated chamber containing a gas consisting essentially of nitrogen and an inert gas having an atomic weight higher than that of nitrogen under low pressure, initiating an electrical discharge while in said gas between a cadmium cathode and said circuit element as an anode, whereby an n-type blocking layer is formed on said circuit element.

8. The process of forming a blocking layer on a selenium cell before the application of a counterelectrode thereto comprising the step of exposing said cell to cadmium sputtering in a dry oxygen-free atmosphere consisting essentially of nitrogen.

9. The process of forming a blocking layer on a selenium cell before the application of a counterelectrode thereto comprising the step of exposing said cell to cadmium sputtering in a dry oxygen-free atmosphere consisting essentially of nitrogen and an inert gas having an atomic weight higher than that of nitrogen.

References Cited in the file of this patent

UNITED STATES PATENTS

| | | |
|---|---|---|
| 1,751,361 | Ruben | Mar. 18, 1930 |
| 2,510,361 | Addink | June 6, 1950 |